Nov. 13, 1951  W. H. ZINN  2,574,681
MATERIAL AND METHOD FOR RADIOGRAPHY
Filed Aug. 17, 1945

Witnesses:
Herbert E. Metcalf
Albert F. Boever

Inventor:
Walter H. Zinn
By Robert A. [Sounders]
Attorney.

Patented Nov. 13, 1951

2,574,681

UNITED STATES PATENT OFFICE 2,574,681

MATERIAL AND METHOD FOR RADIOGRAPHY

Walter H. Zinn, Chicago, Ill., assignor to the United States of America as represented by the United States Atomic Energy Commission Application August 17, 1945, Serial No. 611,101

5 Claims. (Cl. 250—65)

This invention relates broadly to radiography with gamma rays, and more particularly to producing gamma rays for radiography by slow, including thermal, neutron radiation and to the use of such gamma rays in radiography.

In radiography it is often desirable to employ gamma rays for penetrating the radiographed object and exposing the sensitized film. Gamma rays have the advantage of being generally shorter and therefore more penetrating than the radiations produced by an X-ray tube. This greater penetrating power permits the examination of thicker or more dense objects.

The radiography of an awkward shaped body is often difficult to interpret if the rays are passed through the entire body as the image produced on the film shows a confusing pattern caused by the rays passing through various thicknesses. For this reason it is desirable to produce gamma rays so that they emanate from a point source located where the rays will pass through only one portion on the radiographed object to expose on the sensitized film a clear and sharp image.

The standard material for a point source of gamma rays generally is radium. Radium is extremely expensive making its use prohibitive in all but the most important applications. Radium is also dangerous and therefore difficult to handle.

An object of this invention is the novel production of gamma rays.

It is a further object of this invention to provide novel means for radiography with gamma rays produced by slow including thermal neutrons.

A still further object of this invention is the provision of a novel point source of gamma rays that may be positioned to expose a clear image on sensitized film.

Figure 2:
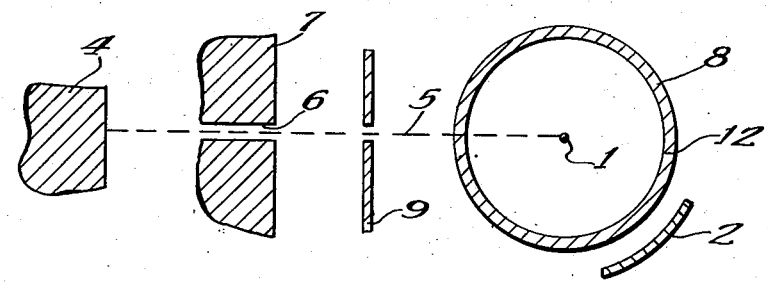
Figure 1:
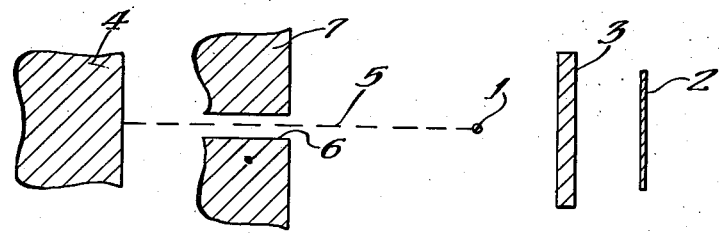

These and other features of the invention will be apparent from the following detailed description of preferred embodiments taken with the accompanying drawings, in which:

Fig. 1 is a vertical sectional view of a device for radiography by gamma rays; incorporating the teachings of the present invention; and Fig. 2 is a vertical sectional view of a device for radiography by gamma rays with the source of gamma rays within the radiographed object.

In general the radiographic method of this invention comprises exposing a sensitized film to gamma rays produced by slow including thermal neutrons incident upon a substance which undergoes the neutron-gamma reaction or upon a substance which emits gamma rays upon bombardment by slow neutrons. The substance emitting the gamma radiation is placed in a position comparable to the source of gamma rays in gammagraphy and a beam of neutrons from a suitable source is directed upon the substance. The object to be radiographed is positioned between the gamma rays emitting substance and the sensitized film.

Referring to Fig. 1, a target 1 is positioned a suitable distance from a sensitized film 2 and the object 3 is placed between the target 1 and the film 2. Slow neutrons from a suitable source 4 and preferably screened of gamma rays are collimated into a beam 5 by a passage 6 through a concrete block 7. The neutron beam 5 is directed to impinge upon the target 1 of a suitable substance such as cadmium or lithium. The neutrons enter the cadmium nuclei and are captured and a neutron-gamma reaction occurs producing gamma rays. The gamma radiation emanating from the target 1 pierces the object 3 and strikes and exposes the film 2 revealing the nature of the interior of the object 3 in the varying density of the exposure on the film.

In addition to the gamma rays produced by the neutron-gamma reaction on capture by the nucleus of a neutron, gamma rays are also emitted by the isotopes 107 and 115 of cadmium which are produced when cadmium is bombarded with slow neutrons. The gamma radiating isotopes 107 and 115 are produced when the nuclei of the isotopes of cadmium 106 and 114 capture the bombarding thermal neutrons. The rays from these radioactive isotopes may also be employed for radiography of the object 3.

A hollow object may be radiographed best by gamma rays which emanate from within the cavity of the radiographed object as in this arrangement the gamma rays pass through the walls of the object once and expose the film. This eliminates the difficulties and objections encountered when the penetrating ray is required to pass through the wall of the object more than once before striking the sensitized film.

In Fig. 2 the wall of a tube 8 is shown radiographed by the method of this invention. As in the apparatus shown in Fig 1, the target 1 is a substance which emits gamma radiation upon bombardment by thermal neutrons. In this modification the target 1 is placed in the interior of the tube 8. A gamma ray sensitive film 2 envelops the tube 8 or that part of it which is examined. The neutron beam 5 collimated from the source 4 through the passage 6 passes through the wall 7 and falls upon the target 1. A gamma radiation is produced either by the neutron gamma reaction or by the formation of a gamma radiating isotope of the target substance. The radiations pass through the tube wall 7 and expose the film 2. The nature and thickness of the portion 12 of the wall 7 passed through is presented on the film 2 by the variations in the density of exposure of the film 2 by the radiations passing through the wall portion.

In the embodiment in Fig. 2 an apertured boron screen 9 is placed between the neutron source 4 and the target 1 to capture stray neutrons and prevent fogging of the sensitized film.

The manner, as described, of positioning the neutron source, the target, the radiographed object, and the sensitized film will suggest various ways by which the radiography may be accomplished. The particular arrangement shown and described herein has been adopted for convenience. It is realized, of course, that other modifications may be made without departing from the scope of the invention. The features of this invention which are believed to be new are expressly set forth in the accompanying claims.

What is claimed is:

1. A radiographic device which comprises a gamma ray sensitized film, a substance capable of emitting gamma rays under neutron bombardment, and a column of slow including thermal neutrons incident upon said substance, said elements being disposed so that an object to be radiographed may be placed a substantial distance from the substance between said gamma emitting substance and said sensitized film and the sensitized film is out of the path of the column of neutrons.

2. A method of radiographing objects comprising placing an object to be radiographed between a cadmium element and a gamma radiation sensitive film at a substantial distance from the cadmium element, and exposing the cadmium element to a collimated beam of slow neutron radiation, said film being placed out of the path of the neutrons.

3. A method of radiographing hollow objects comprising placing a cadmium element within the object to be radiographed, placing a gamma radiation sensitive film outside and adjacent to the object, and exposing the cadmium element to a collimated beam of slow neutron radiation, the film being placed out of the path of the neutrons.

4. A method of radiographing hollow objects comprising placing a small cadmium element within the hollow object to be radiographed, subjecting the cadmium element to a narrow collimated neutron beam, said beam being adapted to penetrate one wall of the hollow object before striking the element, and placing a gamma-radiation sensitive film outside and adjacent to the object and out of the path of the neutron beam.

5. A method of radiographing a hollow object comprising placing an element centrally within the hollow object to be radiographed, said element having a diameter appreciably smaller than the diameter of the object and emitting gamma rays when bombarded with neutrons, subjecting said element to a beam of neutrons, said beam having a diameter approximately equal to the diameter of the element, and placing a gamma radiation sensitive film outside and adjacent to the object to be radiographed, said film being placed out of the path of the collimated neutron beam.

WALTER H. ZINN.

REFERENCES CITED

The following references are of record in the file of this patent:

UNITED STATES PATENTS

| Number | Name | Date |
|---|---|---|
| 2,288,717 | Kallmann et al | July 7, 1942 |
| 2,340,923 | Boucher | Feb. 8, 1944 |
| 2,378,219 | Hare | June 12, 1945 |

OTHER REFERENCES

Physical Review, October 15, 1939, vol. 56, pp. 714–727.